US012184043B2

United States Patent
Von Der Lieck

(10) Patent No.: US 12,184,043 B2
(45) Date of Patent: Dec. 31, 2024

(54) METHOD FOR OPERATING A POWER DISTRIBUTOR

(71) Applicant: Ellenberger & Poensgen GmbH, Altdorf (DE)

(72) Inventor: Guido Von Der Lieck, Nuremberg (DE)

(73) Assignee: Ellenberger & Poensgen GmbH, Altdorf (DE)

( * ) Notice: Subject to any disclaimer, the term of this patent is extended or adjusted under 35 U.S.C. 154(b) by 478 days.

(21) Appl. No.: 17/476,175

(22) Filed: Sep. 15, 2021

(65) Prior Publication Data

US 2022/0006269 A1   Jan. 6, 2022

Related U.S. Application Data

(63) Continuation of application No. PCT/EP2020/052405, filed on Jan. 31, 2020.

(30) Foreign Application Priority Data

Mar. 15, 2019   (DE) ...................... 10 2019 203 521.3

(51) Int. Cl.
   *H02B 1/04*   (2006.01)
   *G05B 9/02*   (2006.01)
   (Continued)

(52) U.S. Cl.
   CPC ................. *H02B 1/04* (2013.01); *G05B 9/02* (2013.01); *H02B 1/056* (2013.01); *H02B 1/205* (2013.01); *H02J 13/00012* (2020.01)

(58) Field of Classification Search
   CPC .......... H02B 1/04; H02B 1/056; H02B 1/205; G05B 9/02; H02J 13/00012
   See application file for complete search history.

(56) References Cited

U.S. PATENT DOCUMENTS

| 5,831,546 | A |   | 11/1998 | Costa et al. |
| 6,086,388 | A | * | 7/2000 | Sloey ...................... H01H 73/08 361/636 |

(Continued)

FOREIGN PATENT DOCUMENTS

| CN | 203084163 U | 7/2013 |
| CN | 103245904 A | 8/2013 |

(Continued)

OTHER PUBLICATIONS

International Search Report dated Apr. 14, 2020 in corresponding application PCT/EP2020/052405.

(Continued)

*Primary Examiner* — Daniel Kessie
*Assistant Examiner* — Brian K Baxter
(74) *Attorney, Agent, or Firm* — Muncy, Geissler, Olds & Lowe, P.C.

(57) ABSTRACT

A method for operating a power distributor, having a first controller, and having a plurality of connected connection modules, each having a base resistor, which form a resistor chain connected in series, which chain is supplied by means of a DC source of the first controller and is guided against a reference potential. Each connection module has a supply connector and a bus connector of a common bus system, which is signal-connected to the first controller. The connection modules are equipped with a circuit breaker, each having a second controller for detecting the electrical voltage dropping at the associated base resistor and a switch element operable by the respective second controller, which element is connected between the side of the associated base resistor facing away from the first controller and the reference potential, and which is signal-connected with the associated bus connector and energized by means of the supply connector.

7 Claims, 1 Drawing Sheet

(51) Int. Cl.
*H02B 1/056* (2006.01)
*H02B 1/20* (2006.01)
*H02J 13/00* (2006.01)

(56) References Cited

U.S. PATENT DOCUMENTS

| | | | |
|---|---|---|---|
| 6,838,999 B1 | 1/2005 | Roepke | |
| 9,509,132 B2* | 11/2016 | Fritsch | H02H 7/085 |
| 9,640,973 B2* | 5/2017 | Rong | H02H 7/222 |
| 10,439,430 B2* | 10/2019 | Chan | G06F 11/3065 |
| 10,707,654 B2 | 7/2020 | Asanza Maldonado | |
| 11,818,859 B2* | 11/2023 | Becker | H05K 7/1478 |
| 2005/0087433 A1* | 4/2005 | Yang | H02B 1/205 |
| | | | 200/400 |
| 2005/0231208 A1* | 10/2005 | Wieland | G01R 19/16571 |
| | | | 324/525 |
| 2007/0184696 A1* | 8/2007 | Melot | H01R 13/7036 |
| | | | 439/215 |
| 2012/0262848 A1* | 10/2012 | Mills | H02B 1/04 |
| | | | 361/636 |
| 2012/0268283 A1* | 10/2012 | Hsu | H05K 1/029 |
| | | | 340/653 |
| 2013/0270902 A1 | 10/2013 | Andersen et al. | |
| 2014/0340822 A1 | 11/2014 | Lat et al. | |
| 2018/0254615 A1* | 9/2018 | Asanza Maldonado | |
| | | | H02B 1/056 |
| 2021/0141017 A1* | 5/2021 | Mori | H01H 21/12 |

FOREIGN PATENT DOCUMENTS

| | | |
|---|---|---|
| CN | 104242652 A | 12/2014 |
| CN | 106302063 A | 1/2017 |
| CN | 207560031 U | 6/2018 |
| DE | 202015009241 U1 | 12/2016 |
| EP | 0806751 A1 | 11/1997 |
| JP | 2008-228379 A | 9/2008 |
| JP | 2018-533900 A | 11/2018 |
| WO | WO2015062731 A1 | 5/2015 |
| WO | WO2017076526 A1 | 5/2017 |

OTHER PUBLICATIONS

Japanese Decision to Grant a Patent for Japanese Application No. 2021-555872 dated Sep. 16, 2022 with English Translation.

* cited by examiner

METHOD FOR OPERATING A POWER DISTRIBUTOR

This nonprovisional application is a continuation of International Application No. PCT/EP2020/052405, which was filed on Jan. 31, 2020, and which claims priority to German Patent Application No. 10 2019 203 521.3, which was filed in Germany on Mar. 15, 2019, and which are both herein incorporated by reference.

BACKGROUND OF THE INVENTION

Field of the Invention

The present invention relates to a method for operating a power distributor, having a first controller, and having a plurality of connection modules, which are or can be equipped with circuit breakers. The invention further relates to a power distributor and a circuit breaker.

Description of the Background Art

Power distributors are generally used for central power supply. They are connected to a main power line to which several secondary circuits are connected. In most cases, each of these secondary circuits is protected by a suitable protective device, such as a circuit breaker. By activating the circuit breakers, it is thus possible to shut down the respective, associated secondary circuit or at least to interrupt the power supply. To simplify assembly of the circuit breakers, the power distributor usually comprises a plurality of connection modules into which the respective circuit breaker can be plugged. The power distributor itself is usually connected to a DIN rail in a control cabinet.

From WO 2017/076526 A1, which corresponds to US 2018/0254615, which is incorporated herein by reference, a power distributor and a method for operating a power distributor are known. It is provided that each of the connection modules has an associated base resistor, which are electrically connected in series. On the basis of an electrical voltage dropping in each case, the address of the circuit breaker in the respective connection module is determined. As a result, communication with another stationary controller and the circuit breakers with each other is possible by means of a bus system. In this way, for example, remote maintenance of the circuit breakers is possible, or these can be reparameterized. It is also possible to trip the individual circuit breakers by means of a central command.

In the case of the abovementioned power distributors, these have a standard address when the power distributor is first put into operation, i.e., when the circuit breakers are first energized. All circuit breakers can therefore only be accessed by the controller via the standard address or via a broadcast address. Therefore, every query from the controller to the circuit breakers is essentially answered simultaneously by all circuit breakers. A single assignment of the mutually superimposed responses to the circuit breaker is no longer possible by means of the controller. Therefore, commissioning is made more difficult.

SUMMARY OF THE INVENTION

It is therefore an object of the present invention to provide a method for operating a power distributor and a suitable power distributor as well as a particularly suitable circuit breaker, wherein advantageously reliability is increased and/or commissioning is simplified.

In an exemplary embodiment, the method is used to operate a power distributor. The power distributor can be, for example, a component of an industrial system, a home supply, a boat, or other motor vehicle which is in particular land-based. The power distributor is at least suitable to be installed there and is used to distribute power. In particular, the power distributor has a connection to a main line. Furthermore, the power distributor conveniently has several connections for secondary circuits. These are expediently at least indirectly connected via other components of the power distributor to the main line connections.

The power distributor also comprises a plurality of connection modules, wherein each of the connection modules is conveniently associated with one of the possible secondary circuits. The individual connection modules can be identical in construction, which streamlines manufacturing costs. Each of the connection modules conveniently has a slot into which a circuit breaker can be plugged. In other words, each of the connection modules is equipped or at least can be equipped with the respective circuit breaker. Suitably, each of the connection modules is provided to accommodate only one circuit breaker. The connection modules are preferably arranged in a row next to each other, which simplifies the installation of the circuit breakers. The required space is also reduced.

For example, the circuit breakers may be equipped in a non-removable manner, so that removing and replacing the circuit breaker from the respective connection module is not possible. Particularly preferably, however, the equipped parts are removable, and the circuit breaker can be plugged only into the respective connection module. In this case, a protective device is used for this purpose, such as a locking mechanism, so that the circuit breaker is prevented from unintentionally detaching from the respective connection module. This increases security.

For example, it may be that none of the connection modules of the power distributor are equipped with such a circuit breaker, or that exactly one of the connection modules is equipped with exactly one circuit breaker. In a further alternative, several connection modules can each be equipped with an associated circuit breaker, or all connection modules can each be equipped with an associated circuit breaker.

Each connection module can have a supply connector, by means of which in particular the respective, associated circuit breaker, if this is available, is supplied with power. The supply connector can have two terminals. In particular, the power distributor comprises a first controller with a power supply, such as a transformer, by means of which a supply voltage is provided, which is applied to the supply connector. In particular, the supply voltage here is a DC voltage and, for example, between 2 V and 24 V. One of the terminals of the supply connector can be guided against a reference potential, against ground, for example. This way, there is a reference potential in each of the circuit breakers. Conveniently, the supply connectors are electrically connected in parallel to each other, so that the individual circuit breakers can be independently supplied.

Furthermore, each connection module can include a bus connector of a common bus system. The bus system extends in particular between all connection modules and conveniently has a plurality of wires. In addition, the bus system is signal-connected with the first controller. The first controller is a component of the power distributor and can be mechanically connected to the connectors. In particular, the first controller is formed as the master of the bus system and operated according to this.

Furthermore, the first controller expediently can have a power source, which is in particular a direct current source. The latter supplies a resistor chain, which is formed from several base resistors. The resistor chain is guided against a reference potential, which is also provided, for example, by means of the first controller. The resistor chain can be electrically guided directly against the reference potential. Particularly preferably, however, guidance against the reference potential occurs indirectly, in particular via another ohmic resistance. Appropriately, the reference potential is equal to the possible reference potential that the supply connector/power supply has. This way, the number of different electrical potentials, and therefore also complexity, is reduced. Mass can be used as the reference potential, preferably ground. This way, interconnection is simplified. Consequently, the direct current source of the first controller is also guided against ground, whereas the remaining connection with the resistor chain is electrically contacted. In particular, an electric current is provided by means of the direct current source, which is less than 1 A, 0.5 A or 0.01 A. In particular, the electric current is between 100 mA and 0.1 mA and, for example, between 10 mA and 1 mA. Consequently, it is possible to use comparatively cost-effective components. Electrical insulation is also simplified.

In summary, the first controller can control communication via the bus system and supplies the resistor chain. Expediently, the first controller, in particular the power source, additionally provides a DC voltage at the supply connectors of the power distributor. Consequently, the connection modules are connected to the first controller, preferably by means of a suitable connector, by means of which the respective components of the respective connection modules are supplied. The first controller can be formed by means of an application-specific circuit (ASIC), a microcontroller and/or several modules, each comprising in particular a flat module. A plurality of electrical/electronic components may be soldered to each of these flat modules.

The base resistors of the resistor chain can be associated with the connection modules, wherein each of the connection modules has exactly one of the base resistors. Thus, there are as many resistors as there are connection modules. The base resistors can differ from each other. Particularly preferably, however, these are equal to each other or have at least the same ohmic resistance. In particular, the ohmic resistance here is between 10Ω and 100 k Ω, between 100Ω and 10 kΩ and, for example, essentially 1 kΩ, wherein, for example, there is a deviation of 10%, 5%, 2%, 1% or 0%.

Each of the circuit breakers intended to equip the connection modules, or by means of which the connection modules are equipped, can have a second controller for detecting the electrical voltage dropping at the associated base resistor. The second controller may include a voltage meter by means of which the electrical voltage dropping at the associated base resistor is detected. In the assembled state, the circuit breaker can be electrically contacted with the resistor chain, preferably on both sides of the respective, associated base resistor. Thus, the circuit breaker has two contacts provided for this purpose, and the connection modules also preferably provide two such contacts, which are preferably a component of a common slot. The common slot preferably also includes suitable contacts for contacting the respective supply connector and the respective bus connector. This way, all contacts are formed via the common slot, which simplifies assembly.

Also, in the assembled state, the respective circuit breaker can be signal-connected to the associated bus connector and energized by means of the supply connector. At the very least, however, the bus connector can be used to signally connect to the respective circuit breaker and the supply connectors can energize the respective circuit breaker. In particular, every second controller is signal-connected to the bus connector in the assembled state and is energized by means of the supply connector. The second controller can be formed by means of an application-specific circuit (ASIC), a microcontroller and/or several modules, each comprising in particular a flat module. A plurality of electrical/electronic components can be soldered to each of these flat modules.

In addition, each circuit breaker can have a switch element which is operated by means of the second controller. The switch element is switched in the assembled state between the side of the associated base resistor facing away from the first controller and the reference potential. Consequently, when the switch element is activated by the second controller, the respectively associated base resistor is guided against the reference potential. As a result, any further secondary base resistors, which are subordinate in this connection module with respect to the first controller, are no longer supplied by the direct current source of the first controller.

The switch element can be a relay or, more preferably, a semiconductor switch, such as a field-effect transistor, for example a MOSFET. In particular, the maximum current carrying capacity of the switch element is comparatively low and suitably less than 0.5 A, 0.1 A or 0.05 A. In particular, a maximum electric voltage that can be switched by the switch element is less than 30 V. Thus, it is possible to use comparatively cost-effective components for the switch element.

The circuit breaker, in particular, performs a certain further function. For example, during operation, an electric current carried by means of the connection module and/or an electrical voltage applied there are monitored. Preferably, this is equal to the electric current or the electrical voltage, which is carried by means of the possible, associated secondary circuit. Thus, the circuit breaker monitors the electrical current carried by means of the secondary circuit and/or the electrical current applied there. A power output guided by the associated secondary circuit, or at least a change in the respective magnitude, can be monitored by the circuit breaker during operation. In this way, it is possible to detect a fault of the secondary circuit by means of the circuit breaker.

In particular, when such a fault is detected or determined, the circuit breaker is switched off so that the secondary circuit is no longer energized. To this end, the circuit breaker expediently has a further switch element, which is, for example, a relay, a semiconductor switch, or a combination thereof. The other switch element or elements are thus in particular incorporated in the current path of the secondary circuit. These are preferably also controlled by means of the second controller, or the circuit breaker has another controller for this purpose. In this case, the other switch elements can be provided and set up to switch an electrical voltage between 10 V and 1000 V or between a maximum of 20 V and 500 V and/or to carry an electric current of no more than 1 A, 5 A, 10 A or 50 A.

The method provides for ensuring that the switch element of each circuit breaker is closed if the circuit breaker is not associated with a specific address. The (specific) address is required for communication via the bus system, expediently by means of a suitable (bus) protocol, wherein the circuit breaker is designed in particular as a slave. If the circuit breaker is not associated with a specific address, hereinafter in particular only referred to as an address, communication over the bus system by means of a bus protocol is not possible or possible only with restrictions. In normal operation, therefore, all circuit breakers suitably have different specific addresses.

For example, if no address is associated, the circuit breaker has no input or the like. In other words, the value of the address is a placeholder. Alternatively, if the circuit breaker is not associated with a specific address, the circuit breaker has a default address, such as zero (0). Preferably, this default address is assigned during production. The specific address can be deleted/unassigned in the event of a failure of the power supply or at least the circuit breaker. In particular, the default address is assigned in this case, for example in the event of a renewed power supply.

Ensuring that the switch element is closed can be done by closing the switch element. Alternatively, for example, the circuit breaker can be delivered with an already closed switch element. Preferably, the switching state is checked by means of a suitable routine. In particular, thus, it is closed when the circuit breaker is first energized, i.e., in particular when the associated connection module is equipped. Due to the closed switch element, the resistor chain is thus guided against the reference potential downstream of the switch element, so that no electrical voltage is generated at the base resistor associated with any further circuit breaker if said resistor is further offset from the first controller.

In a further step, a query is fed into the bus system by means of the first controller. The query can be comparatively short and is addressed to all users in the bus system, so that they receive the query independent of a current address.

In a further step, a response is fed into the bus system by means of the second controller of the circuit breaker. The response is fed only if an electrical voltage drops over the associated base resistor, which is thus different from 0 V. If, on the other hand, no electrical voltage drops over the associated base resistor, no response is fed into the bus system. In particular, the electrical voltage at which the response is fed is greater than 0.5 V and, for example, essentially 1 V. The response is addressed to the first controller, so that this receives the response. The response may not have a transmitter, or it can be specified that a particular circuit breaker has sent out the response. In particular, the response is only fed into the bus system if no address has yet been assigned to the circuit breaker. If an address has already been assigned to it, the response is expediently not fed.

If several connection modules are equipped with circuit breakers to which no address is assigned, only one of the circuit breakers, namely the one located next to the first controller, has a drop in the electrical voltage. Thus, this circuit breaker transmits the response only to the first controller. This also takes place if, for example, each connection module is equipped with an associated circuit breaker, and no address has yet been assigned to them, so that bus communication cannot yet take place.

For example, if the first controller receives no response, there is no circuit breaker. Therefore, in the absence of a response, the first controller has the knowledge that none of the connection modules is equipped with a circuit breaker. Alternatively, for example, every circuit breaker is already associated with an address, so that uninterrupted, continued operation is enabled. If several circuit breakers are already stored in the first controller, and a response is nevertheless detected, it can be deduced that a further circuit breaker is present, and that, for example, another of the connection modules has been equipped with a circuit breaker. This way, even during operation, it is possible to check whether a further circuit breaker has been installed. In particular, the method is used at least for the commissioning of the power distributor, that is, if in particular an initial energization of the circuit breakers, or at least the connection modules, is carried out, in particular by means of the power supply.

By means of the method, the first controller thus has the knowledge as to whether a circuit breaker without an associated address is present, or whether the connection modules are not equipped, for example. This increases reliability.

The switch element or elements can remain closed. Particularly preferably, however, the switch element is opened after feeding in the response. Thus, an electrical voltage is generated at least over another base resistor. Therefore, for a further circuit breaker, it can be seen whether the latter is arranged as the nearest neighbor to the first controller. In particular, after feeding in the response, all switch elements are opened at the circuit breakers. Since the first controller has the knowledge that there is at least one circuit breaker with no assigned address, further bus communication can take place with the circuit breakers that do not have an address. In particular, concrete knowledge about all circuit breakers is not required.

The switch elements of all circuit breakers can be opened when these receive the response of the (one) second controller, which is addressed to the first controller.

Consequently, the associated switch element is opened in all second controllers when the response has been detected. Particularly preferably, however, the first controller feeds in a prompt for opening the switch elements into the bus system when the latter has received the response. The prompt is in particular addressed to all circuit breakers or at least to those without an assigned address. A prompt for opening the switch elements is only used if the first controller has actually received the response. Thus, it is ensured that prior to opening all switch elements, the first controller actually has the information about the additional circuit breaker(s). This further increases reliability.

Each circuit breaker can be assigned an address by the first controller. Particularly preferred, however, each circuit breaker creates its own address, preferably after being queried to do so by the first controller. The creation of the (specific) address is carried out expediently as a function of the electrical voltage dropping over the associated base resistor. After opening the switch elements, an electrical voltage is generated over all base resistors, wherein the value of the electrical voltage is a function of the number of base resistors arranged between the respective connection module and the first controller. In this way, each of the connection modules is assigned a unique specific address, which is assumed in particular by the respective circuit breaker. The respective address is in particular a function of the number of circuit breakers that are actually present, i.e., regardless of how many connection modules are actually equipped with circuit breakers. In particular, the electrical voltage of the respective base resistor against the reference potential is detected to determine the address.

Preferably, the address of each circuit breaker is then fed into the bus system. For this purpose, for example, a certain time slot or a time range for each possible address is provided by means of the first controller. If this occurs, the respective address, or at least a status message, is fed into the bus system by means of the respective second controller so that the first controller is informed that there is a circuit breaker for this address. Thus, subsequently an address is assigned to each circuit breaker, and the first controller has the knowledge as to whether any and how many circuit breakers are present, as well as what address they have, i.e., is assigned to them. As a result, it is possible to use the bus system to perform a coordinated communication between the first controller and the second controller. Appropriately, the respective, specific address is fed into the bus system by the respective circuit breaker after a corresponding prompt from the first controller.

The query from the first controller may be fed into the bus system only once, in particular during commissioning of the power distributor. Particularly preferably, however, the query is fed in several times. The query may be fed in by means of the first controller as a function of a user input. Preferably, the feeding of the query is cyclically repeated by means of the first controller. In particular, a constant period duration is specified, which is in particular between 100 ms and 2 seconds and, for example, between 200 ms and 1 second. In particular, the period duration is equal to 500 ms. Due to the cyclic repetition, newly installed circuit breakers are also recognized by the first controller during operation of the power distributor. In fact, if these are installed, it is in turn ensured that their switch element is closed. And therefore, when the query is received, the response is fed in. As a result, it is possible to install circuit breakers without the need for manual configuration of the power distributor. Therefore, comfort is increased.

The power distributor has a first controller and a plurality of connected connection modules. The power distributor may comprise between 2 connection modules and 40 connection modules, in particular between 5 connection modules and 30 connection modules. Preferably, the power distributor includes exactly 16 connection modules. The first controller and the connection modules conveniently form a common unit that can be mounted on a DIN or G-rail. For example, the power distributor may include such a rail. The connection modules are preferably strung together. Each connection module comprises a base resistor, wherein all base resistors are electrically connected in series and thus form a resistor chain. The resistor chain is provided by means of a direct current source of the first controller, and thus a DC voltage is applied to the resistor chain by means of the first controller. At the very least, the first controller is suitable, in particular intended and set up, for this.

The resistor chain is guided against a reference potential, which is also provided, for example, by means of the first controller. The resistor chain can be electrically guided directly against the reference potential. Particularly preferably, however, it is guided indirectly against the reference potential, in particular via another ohmic resistance. The reference potential is provided, for example, by means of the first controller and/or formed by means of mass, preferably ground.

In addition, each connection module has a supply connector for the electrical supply of a further component connected to it, such as a circuit breaker. In other words, the supply connector is used to energize the respectively associated circuit breaker, by means of which the respective connection module is equipped. Each connection module is therefore suitable, in particular provided and set up, for being equipped with an associated circuit breaker. For this purpose, each connection module expediently has a suitable receptacle. Preferably, each connection module comprises a suitable mechanical device for stabilizing the respectively associated circuit breaker. Preferably, the equipped components are removable.

In addition, each connection module comprises a bus connector of a common bus system, which is signal-connected to the first controller, which conveniently forms a master. Also, in the assembled state, each circuit breaker is signal-connected to the associated bus connector and thus also to the bus system.

Each circuit breaker expediently comprises a second controller for detecting the electrical voltage dropping at the associated base resistor. In particular, a suitable electrical contacting of the base resistor is provided by means of the respective, associated connection module. Furthermore, each circuit breaker has a switch element operated by means of the second controller, which, when installed, is electrically switched between the side of the associated base resistor facing away from the first controller and the reference potential.

The first controller is suitable, in particular provided for and set up, to carry out a method in which it is ensured that the switch element of each circuit breaker is closed when no specific address is associated with said circuit breaker and a query is fed into the bus system by means of the first controller. Ensuring this is accomplished, for example, by means of checking whether the first controller has already fed a query to open the switch element(s) into the bus system. If this has not yet been done, it is ensured in particular that the switch element of each circuit breaker is closed.

By means of the second controller, a response is fed into the bus system if an electrical voltage drops over the associated base resistor. The method is thus carried out at least partially by means of the first controller. The circuit and/or software of the first controller is set up in particular for this. Thus, the power distributor is operated in accordance with this method. In particular, the power distributor comprises a plurality of such circuit breakers, which preferably become a component of the power distributor when connected to the respective, associated connection modules.

The circuit breaker is suitable, in particular provided and set up, to be installed on a power distributor and thus in particular to become a component of the power distributor. For this purpose, the circuit breaker is plugged into a connection module of the power distributor. The connection modules and/or the circuit breaker are suitable, in particular provided and set up, for this purpose. In particular, the circuit breaker is signal-connected to a bus connector of the connection module and is supplied by means of a supply connector of the connection module and thus energized. In summary, the circuit breaker is used to equip the power distributor, which includes a first controller and a plurality of connected connection modules, each of which has a base resistor, which form a resistor chain connected in series. The resistor chain is supplied by means of a direct current source of the first controller and is guided against a reference potential, with each connection module having the supply connector and the bus connector of a common bus system, which is signal-connected to the first controller.

The circuit breaker comprises a second controller for detecting the electrical voltage dropping at the associated base resistor, and a switch element operated by the second controller, which in the assembled state can be switched between the side of the associated base resistor facing away from the first controller and the reference potential. The second controller can be formed by means of an application-specific circuit (ASIC) and/or a microchip/microprocessor or at least comprises these.

The second controller can be operated, at least in part, in accordance with a method in which it is ensured that the switch element is closed when no specific address is associated with the circuit breaker. If a query is fed into the bus system by means of the first controller, a response is fed into the bus system by means of the second controller if an electrical voltage drops over the associated base resistor. The second controller is suitable, in particular intended and set up, for this.

The circuit breaker expediently includes a power semiconductor switch and/or a relay which can be electrically connected in series or in parallel. By means of this, in particular, a protective function is performed, so that the circuit breaker is a protective mechanism. Preferably, the circuit breaker comprises a power sensor and/or an electrical voltage sensor. Conveniently, the power semiconductor switch/relay is operated as a function of the respective sensor data.

If a component is referred to as the first, second, third, . . . component, then this specifically refers to only a certain component. In particular, this does not mean that a certain number of such components are present.

The further developments and advantages described in connection with the method for operating a power distributor can also be applied analogously to the power distributor/circuit breaker, as well as between each other and vice versa.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
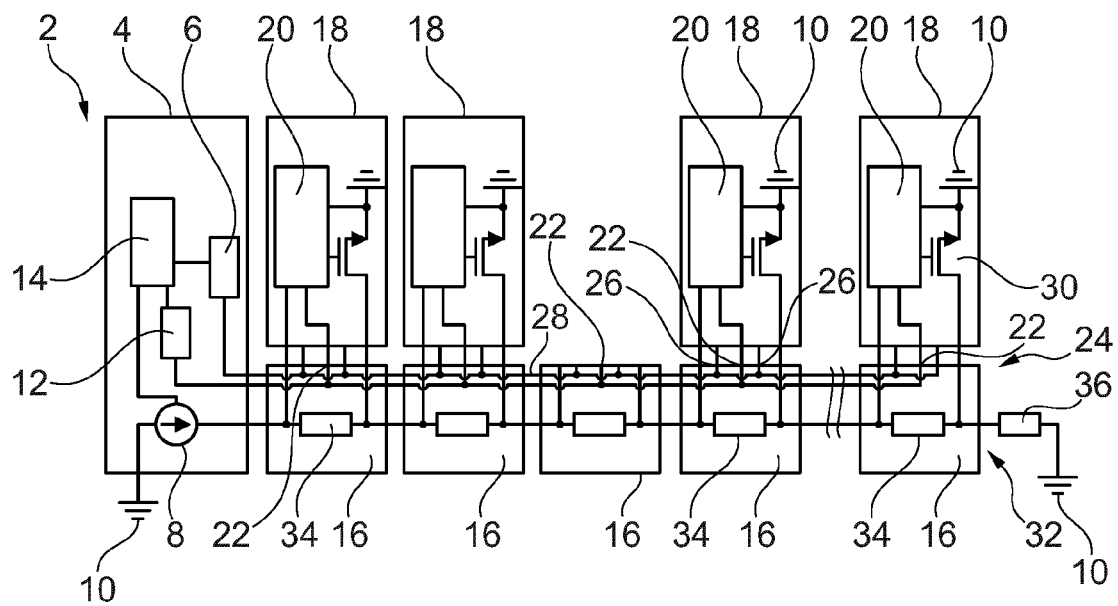
FIG. 1 is. a schematically simplified circuit diagram of a power distributor.

FIG. 1 shows a power distributor 2 with a first controller 4. The power distributor 2 is a component of a building facility by means of which individual (electrical) secondary circuits of the building are energized. For this purpose, the power distributor 2 is arranged in a circuit of the building and connected there. Also, the power distributor 2 is connected to a main power line in a manner not shown. The first controller 4 has a power supply 6, by means of which a DC voltage of 24 V is provided. In addition, the first controller 4 comprises a direct current source 8, by means of which a direct current between 2 mA and 10 mA, in particular 4.8 mA, is provided. Here, the direct current source 8 is guided against a reference potential 10, that is ground. The first controller 4 also includes a bus interface 12 and a control unit 14, by means of which both the DC power source 8 and the power supply 6 as well as the bus interface 12 are controlled.

The power distributor 2 also includes a plurality of connection modules 16, which are identical to each other and connected in series to the first controller 4. Thus, a series is formed by means of the connection modules 16, the beginning of which is the first controller 4. Therefore, the installation of the power distributor 2 is also facilitated. Each of the connection modules 16 is associated with one of the secondary circuits that are energized by means of the main power line.

Each of the overall twenty connection modules 16 is retrofitted to accommodate a circuit breaker 18, so that each of the connection modules 16 can be equipped with a circuit breaker 18 each. In particular, the circuit breakers 18 are a component of the power distributor 2, provided that they are installed on the respective connection module 16. By means of the circuit breaker 18, the associated secondary circuit is protected. For this, each circuit breaker 18 has a suitable protective device, in particular a power semiconductor switch and/or a relay. These are expediently controlled and/or regulated by means of a second controller 20. Thus, there is no prevalence of excess power, no excess electrical current nor excess electrical voltage in the respective, associated secondary circuits. By means of further contacts not shown in more detail, the secondary circuit routed through the respective connection module 16 contacts the respective circuit breaker 18.

The second controller 20 is signal-connected in each case to a bus connector 22 of the respective, associated connection module 16. All bus connectors 22 of the connection modules 16 in turn are signal-connected to each other, so that a common bus system 24 is formed. The bus system 24 in turn is connected to the bus interface 12 of the first controller 4. Thus, all circuit breakers 18 are signal-connected to the first controller 4, which is why communication can take place between them.

Furthermore, each connection module 16 has a supply connector 26, which has two terminals, and which is electrically contacted by means of a power line 28 with the power supply 6 of the first controller 4. Consequently, the circuit breaker 18 is energized by means of the power supply 6 via the respective, associated supply connector 26.

In addition, each circuit breaker 18 has a switch element 30 in the form of a MOSFET, which is operated by means of the respective, second controller 20. Each switch element 30 is guided against the reference potential 10, i.e., against ground. Also, each switch element 30 is guided against a resistor chain 32, which overall has as many base resistors 34 as it has connection modules. In this case, each of the connection modules 16 is associated with one of the base resistors 34, which are electrically connected in series. The resistor chain 32 is supplied by means of the DC power source 8 of the first controller 4 and guided against the reference potential 10 via a further resistor 36. Thus, the resistor chain 32 is electrically connected in series with the further resistor 36. The ohmic value of all base resistors 34 and of the further resistor 36 is the same, namely 1 kΩ.

The second controller 20 is also connected with each associated connection module 16 via other connection contacts, so that these can be used to detect the electrical voltage dropping over the associated base resistor 34. Here, the second controller 20 has in each case a suitable sensor, and in particular suitable hardware. The switch element is connected between the side of the associated base resistor 34 facing away from the first controller 4 and the reference potential 10. Therefore, when activating the respective, associated switch element 30, the resistor chain 32 on the side facing away from the first controller 4 is already guided against the reference potential 10, so that no electrical voltage is generated over the subsequent base resistors 34.

Figure 2:
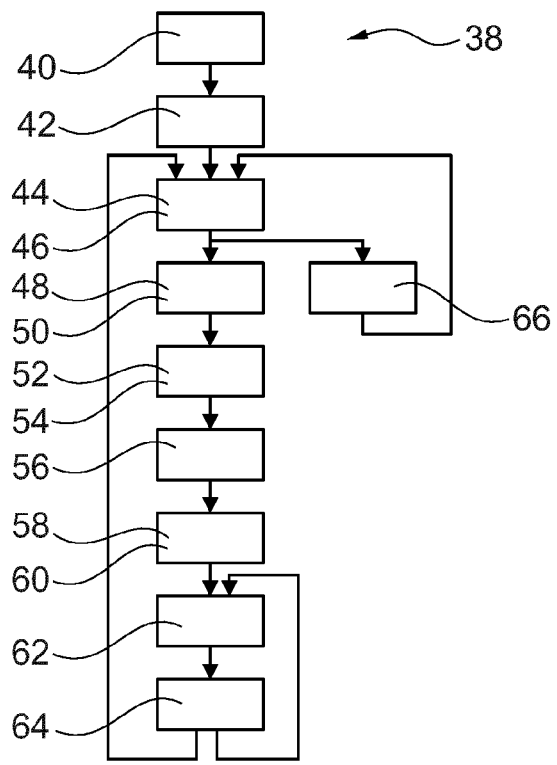
FIG. 2 is a method for operating the power distributor.

The power distributor 2 and the circuit breakers 18 are operated according to a method 38, which is shown in FIG. 2. In this case, the method 2 is carried out or at least started in particular for the commissioning of the power distributor 2. In a first step 40, the control unit 14 is used to activate both the DC power source 8 and the power supply 6 and consequently, any existing circuit breakers 18 are also energized. The first controller 4 has no knowledge yet as to whether any circuit breakers 18 are present and how many.

In a second step 42, each of the circuit breakers 18 are checked to make sure that the respective switch element 30 is closed. This is done by means of the respective second controller 20, in particular as soon as an electrical voltage is applied to it. As a result, the resistor chain 32, downstream of the first, equipped connection module 16 as viewed from the first controller 4, is already guided against the reference potential 10, so that no electrical voltage is generated over the subsequent base resistors 34.

It is only ensured that the switch element 30 is closed if the respective circuit breaker 18 has not yet been assigned a specific address. In other words, at the first current feed, the circuit breaker 18 is checked for a specific address. The specific address may be stored in a volatile memory, which is deleted upon de-energizing. Thus, no specific address is yet associated with the initial power supply. In particular, if the memory is empty, a default address such as zero is used or the value of the specific address may be empty. The specific address is required for communication via the bus system 24. By means of the first controller 4, a master is provided, whereas the circuit breakers 18 are to act as slaves.

In a subsequent third step 44, the first controller 4 feeds a query 46 into the bus system 24. This is addressed to all possible circuit breakers 18 and is therefore received by all circuit breakers 18, namely their second controllers 20.

In a subsequent fourth step 48, each of the circuit breakers 18 who have received the query 46, are checked for an electrical voltage drop over the respective, associated base resistor 34. It is also determined as to whether a (specific) address has already been assigned to the respective circuit breaker 18. If an electrical voltage drops, and if no specific address has been associated so far, the circuit breaker 18 is used to feed a response 50 into the bus system 24, but not otherwise. In the example shown in FIG. 1, none of the circuit breakers 18 have a specific address. Therefore, only in the first circuit breaker 18 is there a drop in electrical voltage over the base resistor 34, so that only the former feeds the response 50 into the bus system 24. The response 50 is addressed to the first controller 4 and is received by this.

In a subsequent fifth step 52, a prompt 54 for opening the switch elements 30 is fed into the bus system 24 by means of the first controller 4. This prompt 54 is addressed to all the second controllers 50 and is received by them. In a subsequent sixth step 56, the second controllers 20, which have received the prompt 54, are used to activate the respective, associated switch elements 30, so that these are opened. As a result, an electrical voltage is generated at each of the base resistors 34.

In a subsequent seventh step 58, each of the second controllers 20 are used to determine the electrical voltage dropping over the respective, associated base resistor 34. Said voltage differs for each of the connection modules 16 and decreases in particular with increasing distance to the first controller 4. In particular, the electrical voltage is taken into account in relation to the reference potential 10. An address is generated on the basis of the electrical voltage. Since the electrical voltages that drop over the respective base resistors 40 differ, the address 60 is different in each case, and each circuit breaker 18 is assigned a unique address 60.

In a subsequent eighth step 62, certain time slots are fed into the bus system 24 by means of the first controller 4, or at the very least defined. Each of these time slots corresponds to a specific address 60. When the time slot corresponding to the associated address 60 occurs, every second controller 20 is used in a ninth step 64 to feed the address 60 into the bus system 24. Thus, the first controller 4 is informed that a circuit breaker 18 corresponding to the respective address 60 is present. Due to the time slots, a collision of the communication of the individual addresses 60 is ruled out. Subsequently, essentially uninterrupted communication of the first controller 4 with the circuit breakers 18 is made possible, wherein the communication is controlled by means of the first controller 4.

After completing the assignment of the addresses 60, the third step 44 is cyclically carried out again and thus the query 46 is fed into the bus system 24. The third step 44 is carried out every 500 ms. If there has been no change to the circuit breakers 18, none of these feed the response 50 into the bus system 24. Consequently, the response 50 is not received by the first controller 4, and it is determined in a tenth step 66 that nothing has changed in the configuration. If an additional circuit breaker 18 is installed, the second step 42 is also carried out in this case, so that when the query 46 is fed in, said circuit breaker generates a response 50. If the response 50 is not received when the power distributor 2 is first put into operation, the tenth step 66 is carried out, and the first controller 4 has the knowledge that no circuit breaker 18 is available.

In summary, the circuit breakers 18 do not, in particular, transmit their specific address unprompted. They operate exclusively in slave mode. The circuit breakers 18 preferably also do not determine their specific address unprompted. The address is appropriately determined on the basis of a prompt from the first controller 4 that the circuit breakers 18 may be addressed. However, before the first controller 4 sends this prompt to the bus system 24, it is necessary to recognize that at least one circuit breaker 18 is present/has been added, to which no specific address has been assigned so far. Therefore, suitably, a query such as "Is there a new circuit breaker?" is sent cyclically. In accordance with the method 38, exactly one previously unaddressed circuit breaker 18, i.e., a circuit breaker which does not yet have a specific address, will respond to this query. After receiving the response 50, the first controller 4 is suitably used to ensure that the DC power source 8, which is required for addressing, is in a stable state. If this is ensured, the first controller 4 expediently prompts the circuit breakers 18 to determine their (specific) address.

The invention is not limited to the exemplary embodiment described above. Rather, other variants of the invention can also be derived therefrom by the skilled person without departing from the subject matter of the invention. In particular, all the individual features described in connection with the exemplary embodiment can also be combined with each other in other ways without departing from the subject matter of the invention.

What is claimed is:

1. A method for operating a power distributor having a first controller and a plurality of connected connection modules, each of the plurality of connected connection modules comprising a base resistor which form a resistor chain connected in series, which is supplied by a DC power source of the first controller and is guided against a reference potential, wherein each of the plurality of connected connection modules has a supply connector and a bus connector of a common bus system, which is signal-connected to the first controller, wherein the plurality of connected connection modules are adapted to be equipped with a circuit breaker, each of which has a second controller for detecting an electrical voltage dropping at an associated base resistor, and which have a switch element operated by a respective second controller, which is connected between a side of the associated base resistor facing away from the first controller and the reference potential and is signal-connected to an associated bus connector and energized by the supply connector, the method comprising:

ensuring that the switch element of each circuit breaker is closed when the circuit breaker is not associated with a specific address;

feeding a query via the first controller into the common bus system; and feeding, via the second controller, a response into the common bus system when the electrical voltage drops over the associated base resistor.

2. The method according to claim 1, wherein after feeding in the response, the switch element is opened.

3. The method according to claim 2, wherein via the first controller, a prompt to open switching elements is fed into the common bus system.

4. The method according to claim 2, wherein after opening the switch element, an address of the respective circuit breaker is created as a function of the electrical voltage dropping over the associated base resistor.

5. The method according to claim 4, wherein the address of each circuit breaker is fed into the common bus system.

6. The method according to claim 1, wherein the feeding of the query by the first controller is cyclically repeated.

7. A method for operating a power distributor having a circuit breaker, which is provided to equip the power distributor, the circuit breaker comprising:

a first controller; and a plurality of connected connection modules, each of the plurality of connected connection modules comprising a base resistor which form a resistor chain connected in series, which is supplied by a DC power source of the first controller and is guided against a reference potential, wherein each of the plurality of connected connection modules has a supply connector and a bus connector of a common bus system, which is signal-connected with the first controller, and which has a second controller for detecting an electrical voltage dropping at an associated base resistor, and which comprises a switch element operated by the second controller, which is adapted to be connected between a side of the associated base resistor facing away from the first controller and the reference potential, and which is adapted to be signal-connected to an associated bus connector and energized via the supply connector, and comprising:

ensuring that the switch element of each circuit breaker is closed when the circuit breaker is not associated with a specific address;

feeding a query via the first controller into the common bus system; and feeding, via the second controller, a response into the common bus system when the electrical voltage drops over the associated base resistor.

\* \* \* \* \*